Feb. 23, 1932.  B. W. STREET  1,846,532
TRANSMISSION
Filed July 28, 1930    4 Sheets-Sheet 1
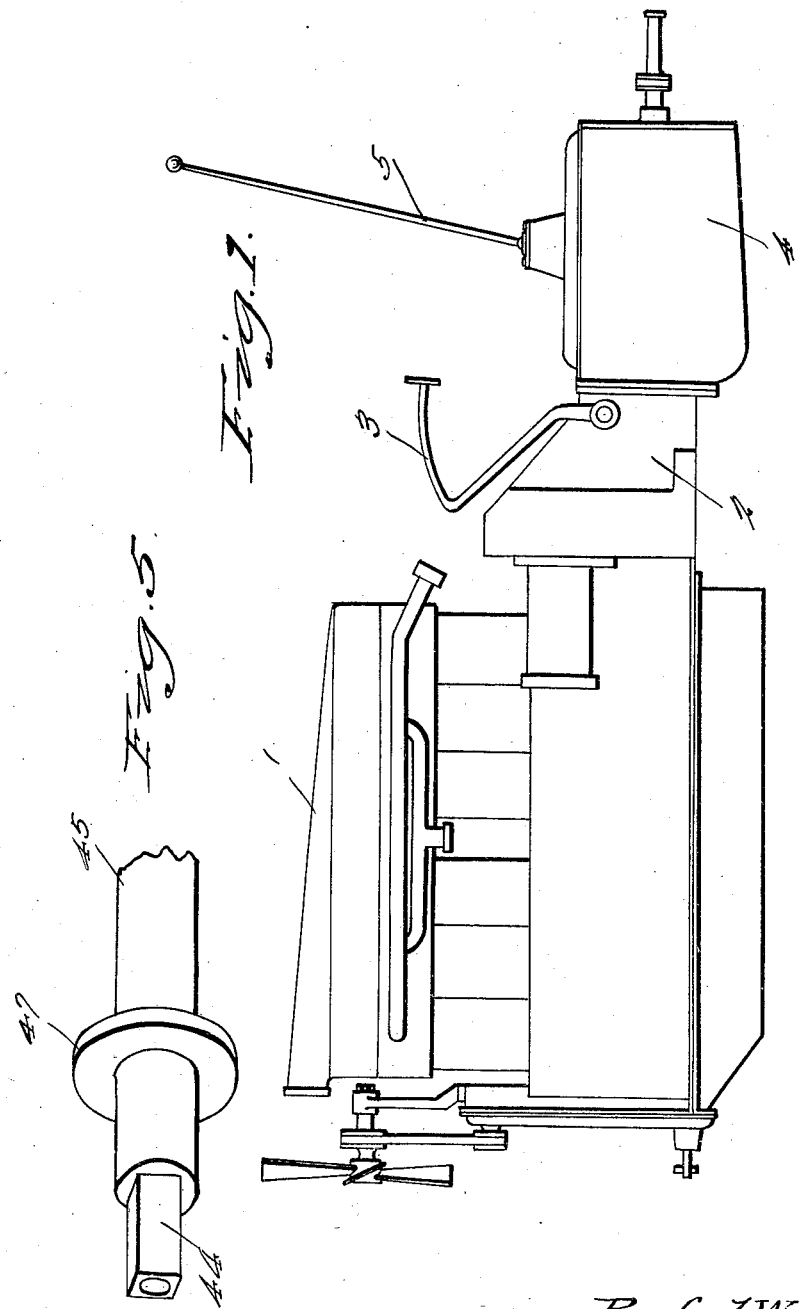
Inventor
Bewford W. Street
By Clarence A. O'Brien
Attorney

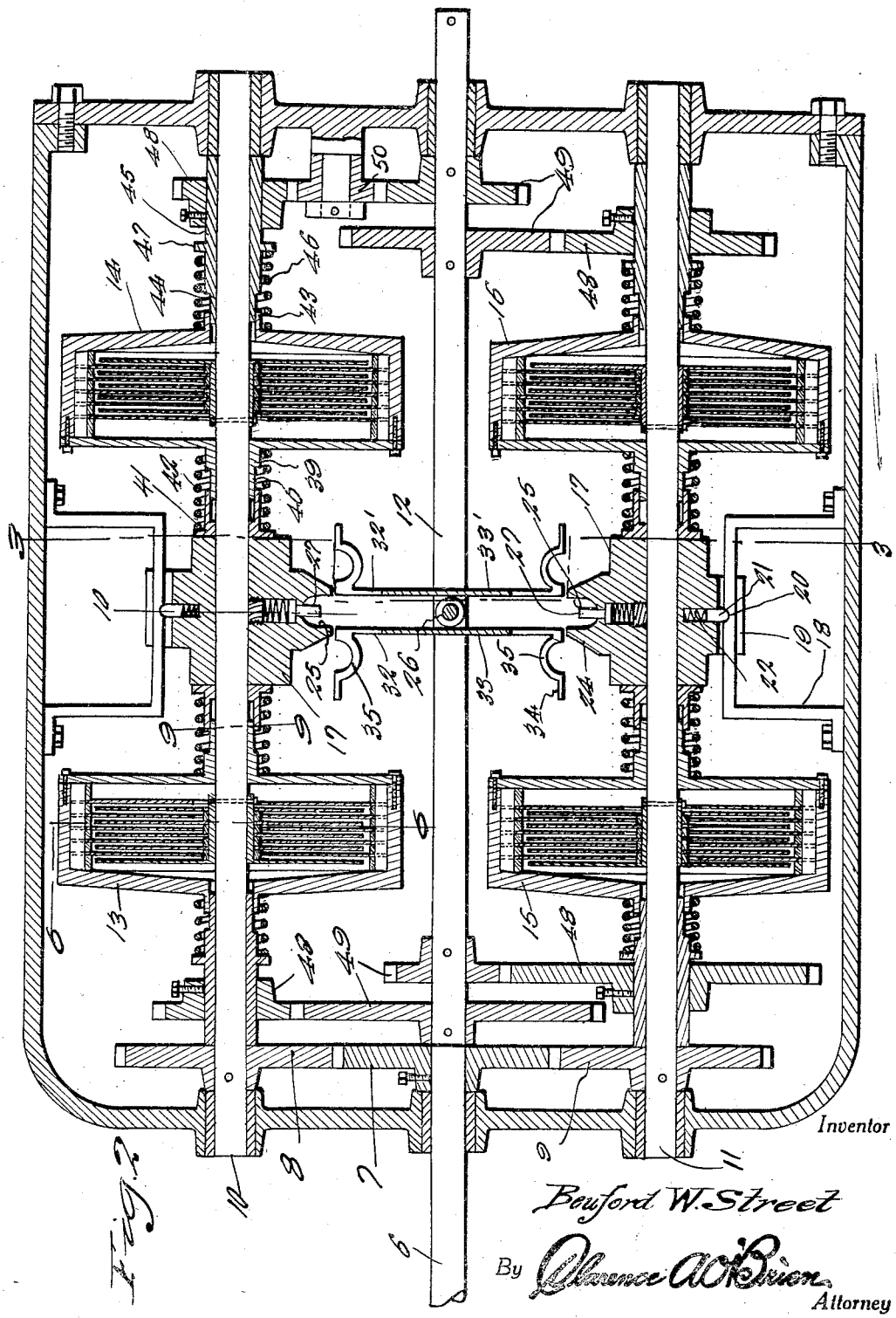

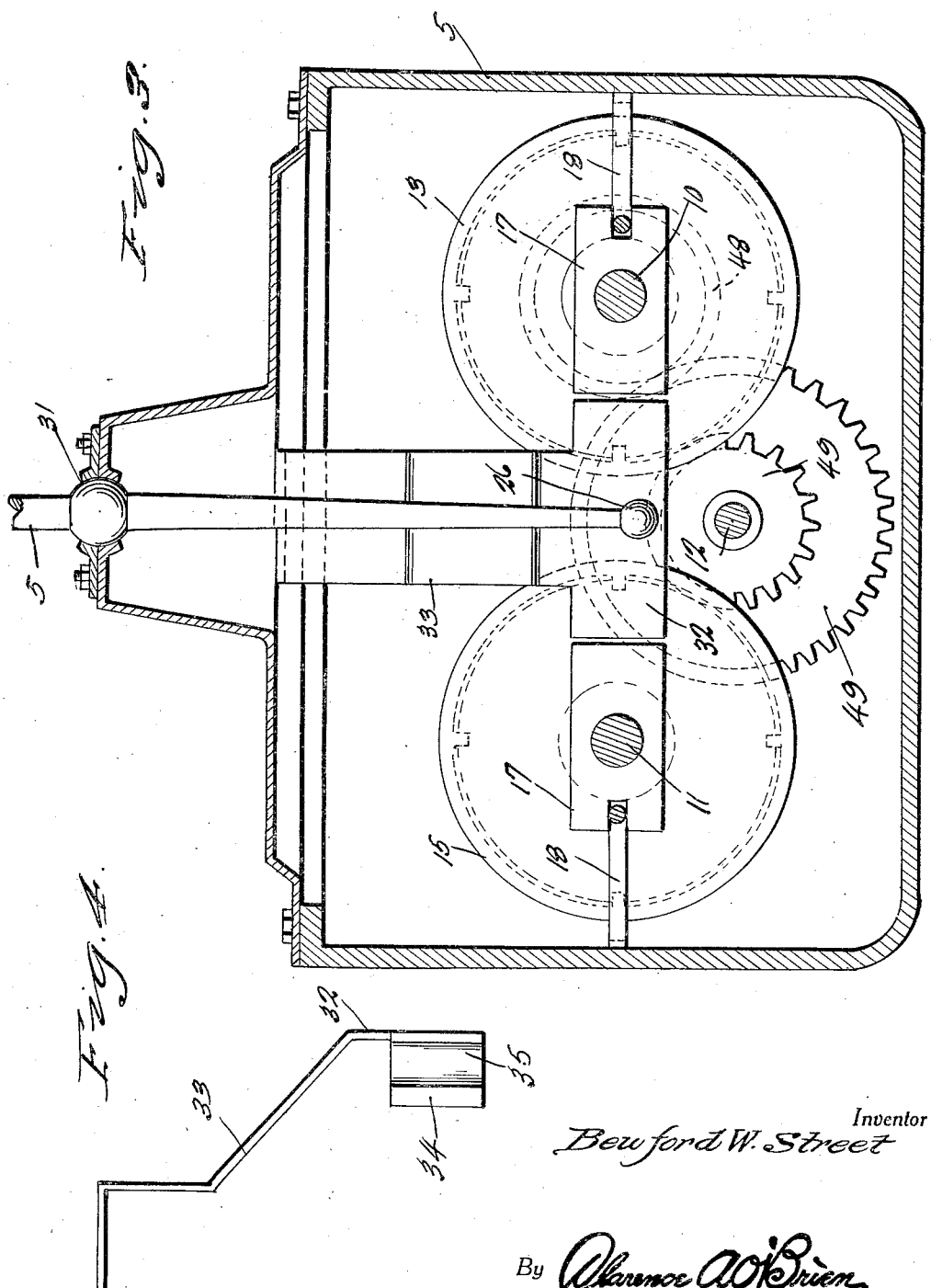

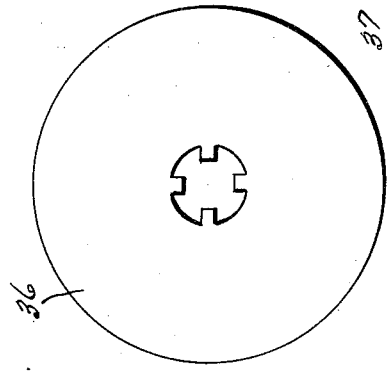
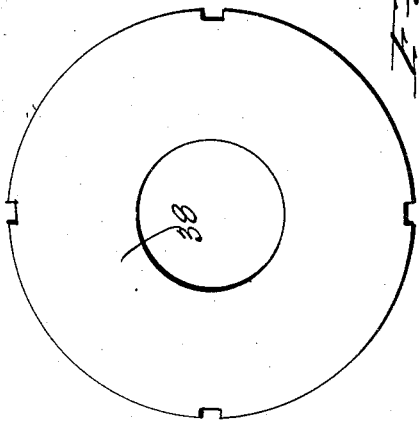
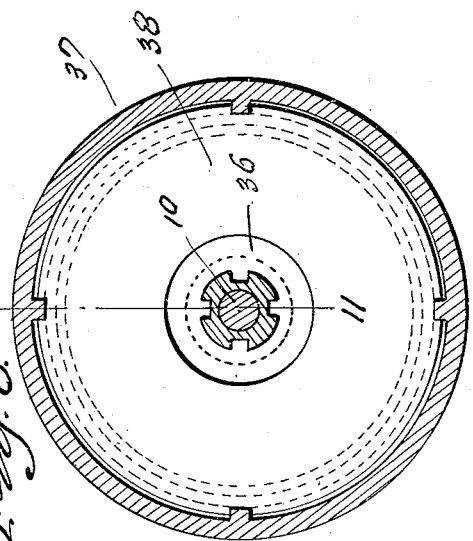
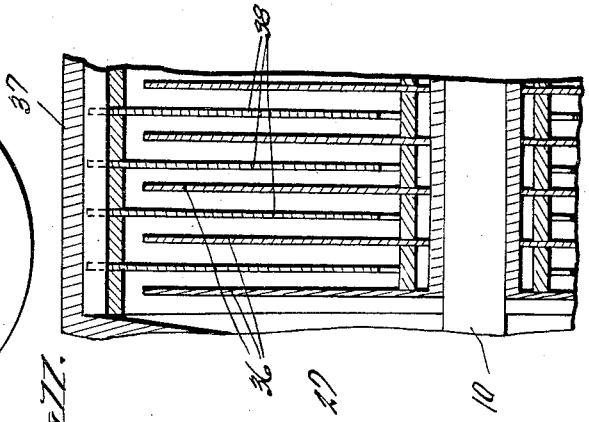
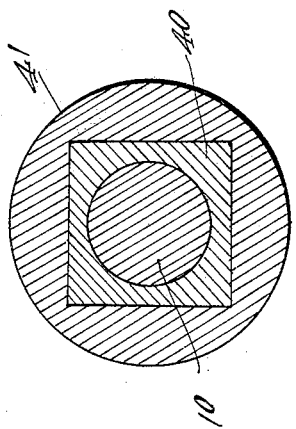

Patented Feb. 23, 1932

1,846,532

UNITED STATES PATENT OFFICE

BEUFORD W. STREET, OF OLNEY, ILLINOIS

TRANSMISSION

Application filed July 28, 1930. Serial No. 471,348.

This invention relates to an improved transmission for motor vehicles and an object of the same is to eliminate the racket and noise attendant upon the shifting of the transmission gears in the operation of the automobile.

A further object of the invention is to provide a transmission embodying a new and novel arrangement of parts whereby the shifting of the speed units of the transmission is accomplished without any disagreeable noise and wherein the shift to any unit of the transmission can be made at any speed in a silent and practically imperceptible manner.

An additional object is to provide a novel form of transmission which dispenses with the use of cogs or gears and employs in their stead, a plurality of driving and driven friction disks adapted to be relatively engaged and disengaged in a silent and efficient manner.

With the above and other objects in view, the invention consists in the novel construction, and arrangement of parts hereinafter more fully described and explained, with reference to the accompanying drawings illustrating the invention and wherein:

Figure 1 is a side elevation of a motor and transmission assembly embodying the invention, Figure 2 is a horizontal cross section on the transmission assembly, Figure 3 is a vertical cross section on line 3—3 of Figure 2, Figure 4 is a detail view of one of the guides for the gear shift lever, Figure 5 is a detail view of one of the gear sleeves, Figure 6 is a cross section of a disk housing on the line 6—6 of Figure 2, Figures 7 and 8 are detail views of a driven and driving disk respectively, Figure 9 is a cross section on the line 9—9 of Figure 2, Figure 10 is a cross section on line 10—10 of Figure 2, and Figure 11 is a sectional detail view of a portion of one of the disk housing assemblies.

In the drawings, the motor is indicated at 1, the clutch housing and clutch operating pedal at 2 and 3 respectively, the transmission housing 4 and the gear shift lever at 5.

As shown in Figure 2, the power end of the clutch shaft 6 is suitably journalled in the forward end of the transmission housing and has a gear 7 fixed thereon which drives the oppositely disposed gears 8 and 9 fixed on the counter shafts 10 and 11 respectively. Positioned centrally between the counter shafts and suitably supported at its ends is the driven shaft 12 which is adapted to be driven from the variable speed units on the counter shaft. For the purposes of the present invention, four speed units are shown and consist of the low speed unit 13 and the reversing unit 14 mounted on counter shaft 10 and the high speed unit 15 and intermediate speed unit 16 mounted on counter shaft 11. Slidably mounted on each counter shaft between the speed units thereof is a slide block 17 which is guided in its sliding movement along the counter shaft, as well as being held against rotation thereon, by a guide bracket 18 anchored to a side wall of the housing 4 and extending longitudinally within a horizontally disposed guide groove 19 in the adjacent face of the block, as shown in Figures 2 and 10.

The guide bracket has a centrally located notch 20 in which seats the locking pin 21 of the block for normally holding the block in a neutral position. The pin 21 is yieldably held in its seating notch by a tension spring 22 arranged within the inner portion of the pin recess 23. Formed on the opposite face of the block 17 is a forwardly disposed boss or protuberance 24 having a vertically extending groove or channel 25 adapted to be engaged at times by a ball or knob 26 on the lower end of the shift lever 5.

Protruding into the channel 25 from the bottom wall thereof is a pin 27 having an enlarged base slidably housed within a recess 28 closed at its inner end by a screw plug 29. The pin 27 is normally maintained in extended position from the recess by the action of a spring 30 confined between the base of the pin and the inner face of the screw plug.

As shown in Figure 3, gear shift lever 5 has a universal mounting 31 permitting it to be actuated for moving the lower or ball bearing end forward, backward and sideways. The ball end 26 of the shift lever is normally positioned between the guide plate 32 and 32' at the lower depending ends of front and rear guides 33 and 33' respectively. Each guide is of the construction shown in Figures 2, 3, and 4 and are suitably attached at their respective upper ends to the cover or other convenient part of the transmission housing. Each guide plate has a rearwardly extending wing 34 adjacent each end thereof and formed with a vertically extending groove 35 of semi-circular cross section to seat the ball 26 of the shift lever.

The slide blocks 17 of the counter shaft are normally positioned with respect to the guide plates 32 and 32' so that each open end of the sideway between the plates is confronted by a channel 25 in which the ball 26 engages when the lower end of the lever is moved sideways during the gear shifting operation.

Since the variable speed units are similar in construction and manner of operation, a description of one will suffice for all. Each unit embodies a speed gear of the friction clutch disk type including a plurality of spaced apart driving disks 36 fixedly mounted on the counter shaft and closed by a disk housing 37 having a plurality of disks 38 fixed thereto and depending in the spaces between the disks 36. The housing 37 is provided at its inner end with a shaft encircling hub 39 having an extension 40 of square shape on the outside to fit within a square recess in a thrust collar 41 having a flanged end disposed in abutment against one end of a slide block 17.

A spring 42 encircles the hub 39 in the collar 41 between the inner face of the housing and the flanged end of the collar and is tensioned to normally hold the extension 40 disposed near the outer end of the recess of the collar. On its outer side, the disk housing is provided with a hub 43 having a square shaped bore in which is received the extension 44 of a gear sleeve 45, which extension is also of square shape on the outer side to conform to the shape of the bore of the hub 43 which is slidable thereon.

A spring 46 encircles the hub 43 and the adjacent portion of the sleeve 45, being seated at one end against the adjacent face of the housing and at the other end against the flange 47 on the sleeve. The disk housings, gear sleeves, and thrust collars are loose on their respective counter shafts and the springs 42 and 47 act oppositely to each other to normally position the housing therebetween with its disks 38 out of contact with the shaft carried disk 36. Each sleeve 45 has a gear 48 fixedly mounted thereon, and, with the exception of the reversing unit 14, in mesh directly with a gear 49 fixed on the drive shaft 12.

The reversing unit includes a reversing gear 50 interposed between the sleeve gear 48 and and the driven shaft gear 49 for reversing the direction of rotation of the driven shaft. The motion of crank shaft 6 is transmitted to the counter shaft through the gears 7, 8 and 9 and from the counter shaft to the driven shaft through the gears of the several speed units, each of which will have a different gear ratio to provide the required changes in speed.

In the neutral position of the shift, the parts are relatively arranged as shown in Figure 2 and in shifting from neutral to low or starting speed, the gear shift lever 5 is moved to shift the knob 26 toward the top of Figure 2 until it engages in the channel 25 of the slide block 17 and pushes back the pin 27. The lever is then moved to shift the slide block to the left of the figure and when the channel 25 is opposite the groove 35 of the guide ring 34, the ball 26 of the shift lever will enter the groove under pressure from the spring 30 acting against the pin 27. At this time, the disks 38 of the housing are frictionally engaged with the revolving disk 46 of the counter shaft, due to the compression of springs 42 and 46 and the housing rotates with the shaft, carrying with it the sleeve 45 and the gear 48 which by reason of its driving connection with gear 49 rotates the driven shaft 12 at a low speed.

By following the same operation but reversing the direction of the shift, the change from low to second or intermediate speed is similarly effected. In shifting to high, the gear shift lever is pulled straight back from second speed and to shift into reverse, the operation is the same as in shifting into low speed, except that the ball 26 is moved to the right of the figure.

From the foregoing it will be apparent that the shift from one unit of the transmission to another is accomplished in a silent and efficient manner, there being no gears to clash or grind with the disagreeable racket always associated with the shifting of gears of the intermeshing cog type. Other advantages in respect to construction and operation of the transmission will be apparent from the preceding description of the invention and it is to be understood that various changes and alterations may be made within the scope of the invention claimed.

Having thus described my invention, what I claim as new is:

1. In a transmission, a gear shift lever, a guide plate along which the lower end of said lever is movable, said plate having a laterally disposed socket at one end for receiving the lower end of the lever, a slide block movable crosswise of the end of the guide plate and having a socket adapted when adjacent the end of the plate to be entered by the lower end of the lever whereby shifting of the lever will move the block, and means in the socket of the block for causing the said end of the lever to be shifted into the laterally disposed socket of the guide plate when the socket of the said movable block is opposite thereto, whereby the lever and block will be yieldingly held in shifted position.

2. In a transmission, a gear shift lever, a pair of guide plates between which the lower end of said lever is movable, each plate having a laterally disposed socket at one end for receiving the lower end of the lever, a slide block movable crosswise of the ends of the spaced guide plates, and having a socket therein adapted when adjacent the space between the plates to be entered by the lower end of the lever whereby shifting of the lever will move the block, means for yieldingly holding the block in a position with the socket opposite the space between the plates and a spring-pressed plunger in the block and extending into the socket for pressing the lower end of the lever into a lateral socket when the socket of the block is opposite the lateral socket, whereby the lever and block will be yieldingly held in shifted position.

In testimony whereof I affix my signature.

BEUFORD W. STREET.